(12) United States Patent
Scheer et al.

(10) Patent No.: US 11,331,949 B2
(45) Date of Patent: May 17, 2022

(54) TIRE HAVING REPLACEABLE DISCRETE TRACTION ELEMENTS

(71) Applicant: GOODRICH CORPORATION, Charlotte, NC (US)

(72) Inventors: Dustin Paul Scheer, Jamestown, ND (US); Aaron J. Roberts, Jamestown, ND (US)

(73) Assignee: Goodrich Corporation, Charlotte, NC (US)

(*) Notice: Subject to any disclaimer, the term of this patent is extended or adjusted under 35 U.S.C. 154(b) by 821 days.

(21) Appl. No.: 16/135,798

(22) Filed: Sep. 19, 2018

(65) Prior Publication Data

US 2020/0086689 A1 Mar. 19, 2020

(51) Int. Cl.
| | |
|---|---|
| *B60C 7/08* | (2006.01) |
| *B60C 7/10* | (2006.01) |
| *B64D 9/00* | (2006.01) |
| *B60C 7/26* | (2006.01) |
| *B60C 7/24* | (2006.01) |
| *B65G 23/08* | (2006.01) |
| *B60C 11/02* | (2006.01) |
| *B60C 11/11* | (2006.01) |
| *B60C 11/00* | (2006.01) |
| *B65G 13/04* | (2006.01) |
| *B65G 13/06* | (2006.01) |
| *B65G 39/07* | (2006.01) |

(52) U.S. Cl.
CPC ............... *B60C 7/08* (2013.01); *B60C 7/102* (2013.01); *B60C 7/24* (2013.01); *B60C 7/26* (2013.01); *B60C 11/0041* (2013.01); *B60C 11/02* (2013.01); *B60C 11/11* (2013.01); *B64D 9/00* (2013.01); *B65G 13/04* (2013.01); *B65G 13/06* (2013.01); *B65G 23/08* (2013.01); *B65G 39/07* (2013.01); *B64D 2009/006* (2013.01)

(58) Field of Classification Search
CPC .. B60C 7/08; B60C 7/102; B60C 7/24; B60C 7/26; B60C 11/0041; B60C 11/02; B60C 11/11; B65G 13/04; B65G 13/06; B65G 23/08; B65G 39/07; B64D 2009/006
USPC ........................................................ 198/788
See application file for complete search history.

(56) References Cited

U.S. PATENT DOCUMENTS

| | | |
|---|---|---|
| 2,886,091 A | 5/1959 | Hines |
| 4,086,947 A | 5/1978 | Payne |
| (Continued) | | |

FOREIGN PATENT DOCUMENTS

| | | |
|---|---|---|
| CA | 2204053 | 10/1998 |
| EP | 2918496 | 9/2015 |
| (Continued) | | |

OTHER PUBLICATIONS

European Patent Office, European Search Report dated Feb. 14, 2020 in Application No. 19197811.3.

(Continued)

*Primary Examiner* — Gene O Crawford
*Assistant Examiner* — Lester Rushin, III
(74) *Attorney, Agent, or Firm* — Snell & Wilmer L.L.P.

(57) ABSTRACT

A tire may comprise a hub and a plurality of discrete traction elements coupled to the hub. Each of the traction elements may comprise a backing plate and an elastomeric material bonded to the backing plate. Circumferentially adjacent traction elements may axially overlap.

16 Claims, 8 Drawing Sheets

(56) References Cited

U.S. PATENT DOCUMENTS

| | | | | |
|---|---|---|---|---|
| 4,589,542 A | * | 5/1986 | Steadman | B64D 9/00 |
| | | | | 198/782 |
| 5,437,585 A | * | 8/1995 | Sundseth | B65G 13/065 |
| | | | | 198/782 |
| 7,717,252 B2 | * | 5/2010 | Stewart | B64D 9/00 |
| | | | | 198/782 |
| 10,800,527 B2 | * | 10/2020 | Puthiyaveettil | B60B 19/003 |
| 11,148,468 B1 | * | 10/2021 | Ballena | B60C 7/10 |
| 11,173,744 B2 | * | 11/2021 | Kemeny | B60C 7/146 |
| 2018/0029707 A1 | | 2/2018 | Levron | |
| 2018/0083295 A1 | * | 3/2018 | Oyama | H01M 8/0206 |
| 2020/0156410 A1 | * | 5/2020 | Bateman, Jr. | B60C 7/08 |

FOREIGN PATENT DOCUMENTS

| | | | | |
|---|---|---|---|---|
| EP | 3659824 | | 6/2020 | |
| FR | 363386 | | 7/1906 | |
| FR | 363386 A | * | 7/1906 | B60C 7/102 |
| WO | 2007107812 | | 9/2007 | |

OTHER PUBLICATIONS

European Patent Office, European Office Action dated Jul. 1, 2021 in Application No. 19197811.3.

* cited by examiner

TIRE HAVING REPLACEABLE DISCRETE TRACTION ELEMENTS

FIELD

The present disclosure relates to tires, and more specifically, to tires having discrete traction elements.

BACKGROUND

Typically large aircraft utilize powered cargo loading systems comprising a plurality of power drive units (PDUs) to assist the loading of cargo and equipment into the aircraft. A train and/or series of PDUs may serve to assist pallets and containers of desired dimensions traveling from fore to aft, from aft to fore, and into and out of the cargo hold of an aircraft. Conventionally, PDUs comprise a tire to provide motive force to a Unit Load Device (ULD). Current tires consist of a solid hub with a traction material bonded around the exterior diameter of the hub. Wear and/or damage to the traction material may necessitate replacement of tire. Tire replacement can involve significant time and effort, as the entire tire (i.e., the hub and the traction material) may need to be removed and replaced.

SUMMARY

Disclosed herein, in accordance with various embodiments, is a tire. The tire may comprise a hub, a first traction element coupled to the hub, and a second traction element coupled to the hub. The second traction element may be discrete from the first traction element.

In various embodiments, the first traction element may comprise a first backing plate and a first elastomeric material bonded to the first backing plate, and the second traction element may comprise a second backing plate and a second elastomeric material bonded to the second backing plate.

In various embodiments, the first traction element may axially overlap the second traction element. In various embodiments, an axially extending edge of the first traction element may be oriented at at least one of an acute angle or an obtuse angle with respect to a circumferentially extending edge of the first traction element.

In various embodiments, the first backing plate may define an aperture configured to receive a protrusion extending from the hub. A first fastener may couple the first traction element to the hub, and a second fastener may couple the second traction element to the hub.

In various embodiments, a first pattern defined by the first elastomeric material may be different from a second groove pattern defined by the second elastomeric material. In various embodiments, the first elastomeric material is different from the second elastomeric material.

Also disclosed herein, in accordance with various embodiments, is a power drive unit comprising a tire and a drive motor configured to drive a rotation of the tire. The tire may include a hub and a plurality of traction elements coupled to the hub.

In various embodiments, a first traction element of the plurality of traction elements may comprise a first backing plate and a first elastomeric material bonded to the first backing plate. A second traction element of the plurality of traction elements may comprise a second backing plate and a second elastomeric material bonded to the second backing plate.

In various embodiments, the first backing plate may define an aperture configured to receive a protrusion extending from the hub. In various embodiments, the first traction element may axially overlap the second traction element.

In various embodiments, a gear may be located within a volume defined by a radially inward surface of the hub. In various embodiments, a first fastener may couple the first traction element to the hub, and a second fastener may couple the second traction element to the hub.

In various embodiments, the first elastomeric material may be different from the second elastomeric material. In various embodiments, an axle may be rotationally coupled to the hub. The axle may comprise a single unibody piece extending between opposing axial ends of the tire.

Also disclosed herein, in accordance with various embodiments, is a tire for a power drive unit. The tire may comprise a first traction element and a second traction element adjacent to the first traction element. The first traction element may comprise a first backing plate and a first elastomeric material bonded to the first backing plate. The second traction element may comprise a second backing plate and a second elastomeric material bonded to the second backing plate.

In various embodiments, the first traction element may axially overlap the second traction element.

In various embodiments, the tire may further comprise a hub. The first traction element and the second traction element may be coupled to the hub. The first backing plate may define a first aperture configured to receive a first protrusion extending from the hub. The second backing plate may define a second aperture configured to receive a second protrusion extending from the hub.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Cross hatching lines may be used throughout the figures to denote different parts but not necessarily to denote the same or different materials. Throughout the present disclosure, like reference numbers denote like elements. Accordingly, elements with like element numbering may be shown in the figures, but may not necessarily be repeated herein for the sake of clarity.

Figure 1:
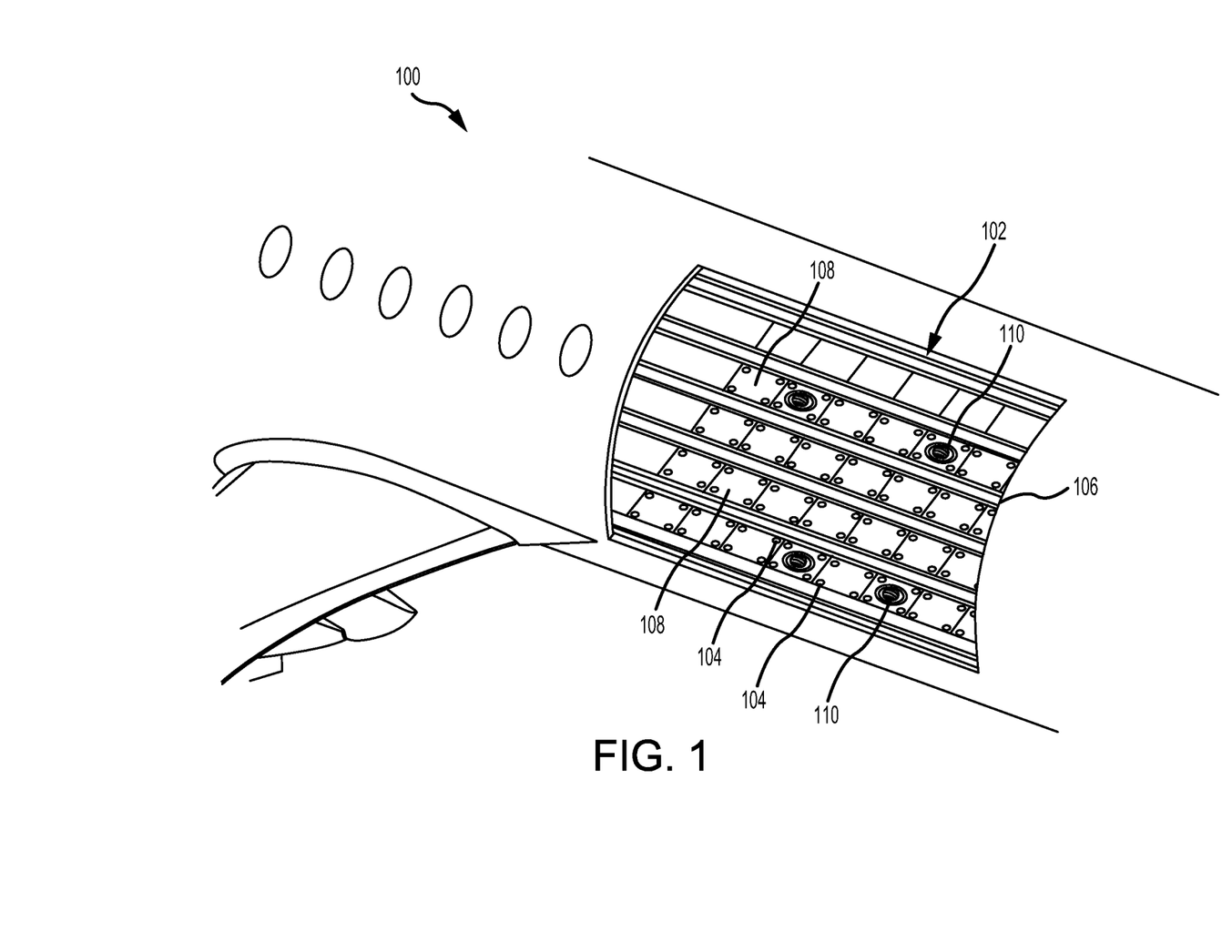
FIG. 1 illustrates a perspective view of an aircraft cargo bay, in accordance with various embodiments.

With reference to FIG. 1, an aircraft 100 is illustrated having a cargo compartment 102. A cargo door 106 provides access to cargo compartment 102 from outside aircraft 100. To facilitate movement of a ULD within cargo compartment 102, as the ULD is loaded, stowed, and unloaded. Cargo compartment 102 may include a number of raised roller elements 104. Raised roller elements 104, in various embodiments, may be part of elongated roller trays 108 that extend longitudinally along a length of cargo compartment 102. The ULDs sit atop raised roller elements 104, which facilitate rolling movement of the ULDs within cargo compartment 102. In various embodiments, cargo compartment 102 may be equipped with one or more power drive units (PDUs) 110. PDUs 110 may comprise a tire that can be selectively raised, and selectively energized to propel a ULD across cargo compartment 102 in a desired direction. As disclosed herein, the tire may include a number of discrete traction elements. The discrete traction elements are coupled to a hub of the tire independently from one another. The traction elements may thus be removed and/or replaced individually. In accordance with various embodiments, the traction elements may be removed from the tire, without having to remove the tire from the PDU.

Figure 2A:
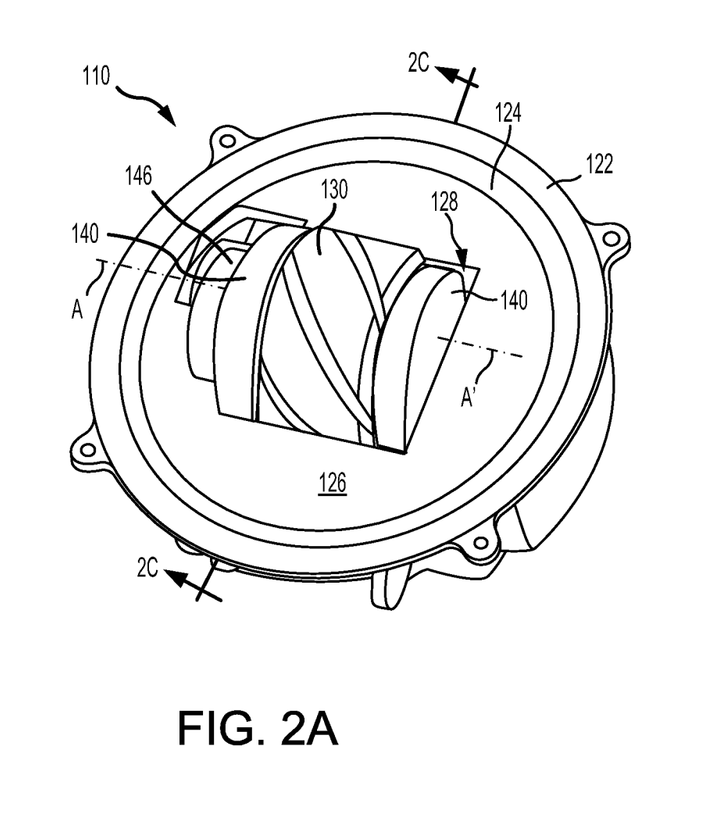
FIGS. 2A and 2B illustrate a perspective top view and a perspective bottom view, respectively, of a power drive unit (PDU) having a tire with discrete traction elements, in accordance with various embodiments.

Referring now to FIG. 2A, a PDU 110 is illustrated, in accordance with various embodiments. In various embodiments, PDU 110 includes a mounting ring 122, which supports a rotatable frame or pivot plate 124. Pivot plate 124 may incorporate a removable cover 126, which includes an opening 128 that permits a tire 130 to extend upwardly to a raised active position (e.g., tire 130 extends from a retracted position within a deck of an aircraft cargo compartment toward the ceiling of the aircraft, such that at least a portion of tire 130 protrudes through the deck of the aircraft cargo compartment. Tire 130 may rotate about an axis of rotation A-A'. As used herein, "axial" and refers to a direction parallel to axis A-A'. As used herein, "radial" refers to a direction orthogonal to axis of rotation A-A'. As used herein, "circumferential" and refers to a direction about axis of rotation A-A'. In various embodiments, one or more skid plates 140 may be located at opposing axial ends of tire 130. A gear housing 146 may be located adjacent skid plate 140. Gear housing 146 is located around (i.e., houses) a gear 148, with momentary reference to FIG. 2C. As described in further detail below, gear 148 may be configured to transfer rotational motion, or torque, to tire 130.

Figure 2B:
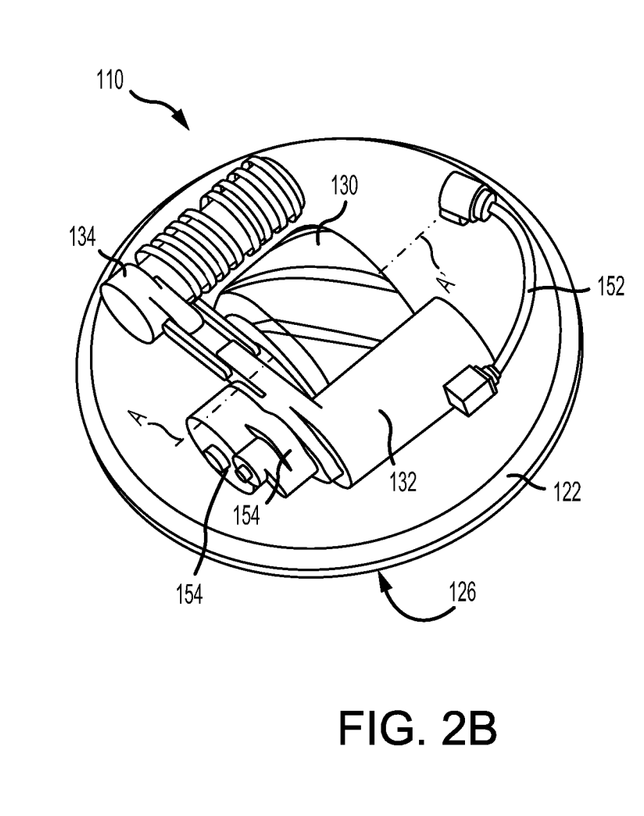

Referring now to FIG. 2B, PDU 110 also includes a drive motor 132 and a lift actuator 134. Drive motor 132 is configured to drive rotation of tire 130 in either direction (e.g., forward or reverse) and lift actuator 134 raises and lowers tire 130 with respect to the removable cover 126. In various embodiments, an electrical conduit 152 may be electrically coupled to drive motor 132. Electrical conduit 152 may carry various power inputs from a power supply and control module that are configured to power drive motor 132 and lift actuator 134. Drive motor 132 may be operationally coupled to one or more gear trains 154.

Figure 2C:
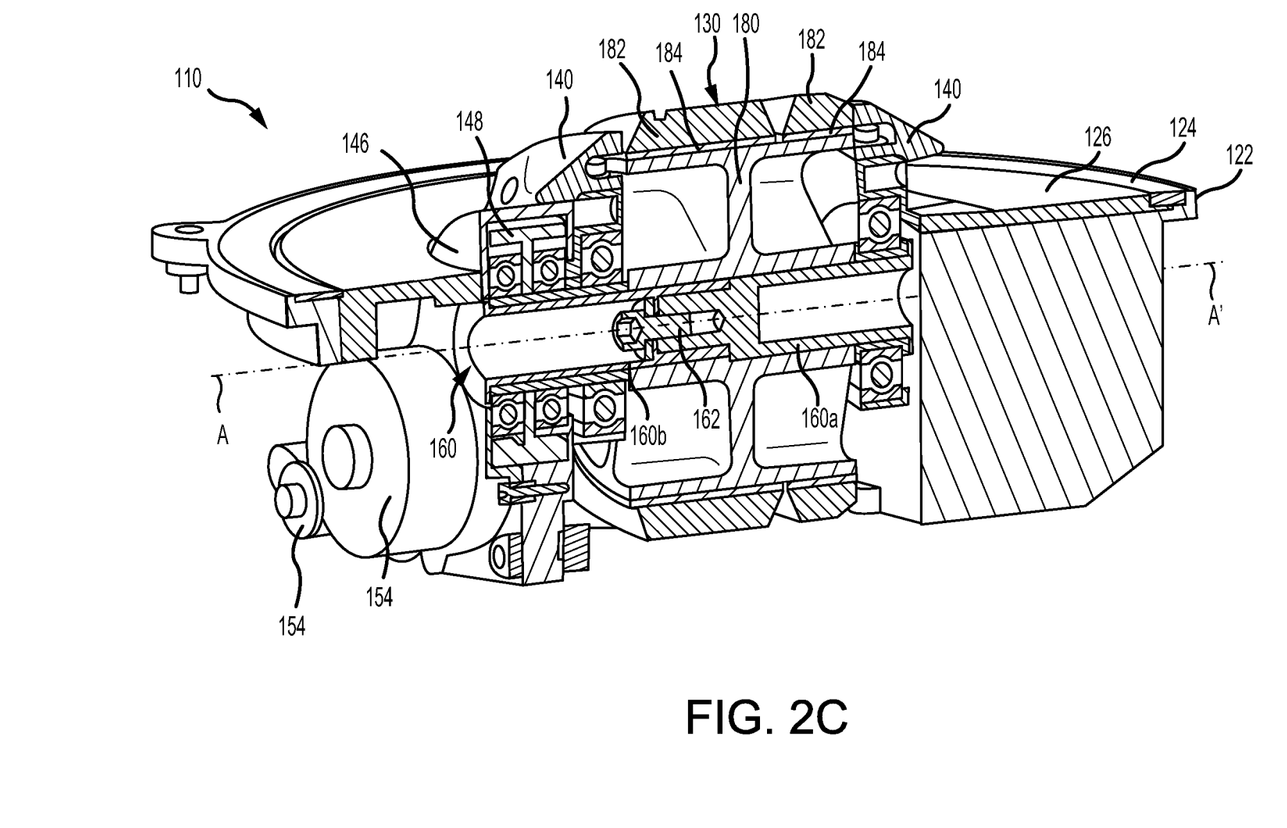
FIG. 2C illustrates a cross section view of the PDU of FIG. 2A taken along the line 2C-2C in FIG. 2A, in accordance with various embodiments.

With combined reference to FIGS. 2B and 2C, in various embodiments, gear trains 154 may be located between drive motor 132 and gear 148. Gear trains 154 include one or more gears rotationally coupled to drive motor 132 and gear 148. Gear trains 154 are configured to transfer rotational motion from drive motor 132 to gear 148.

Referring now to FIG. 2C, in various embodiments, gear 148 may be rotationally coupled to an axle 160. Axle 160 is rotationally coupled to a hub 180 of tire 130, and configured to transfer torque to hub 180. Gear 148 may transfer torque to, and drive a rotation of, axle 160, which in turn drives a rotation of tire 130. In various embodiments, axle 160 may comprise two discrete portions (e.g., first portion 160a and second portion 160b). First discrete portion 160a may be attached to second discrete portion 160b by a fastener 162. First and second discrete portions 160a, 160b may allow tire 130 to be removed from PDU 110, without having to remove PDU 110 from cargo compartment 102 of FIG. 1.

Figure 3A:
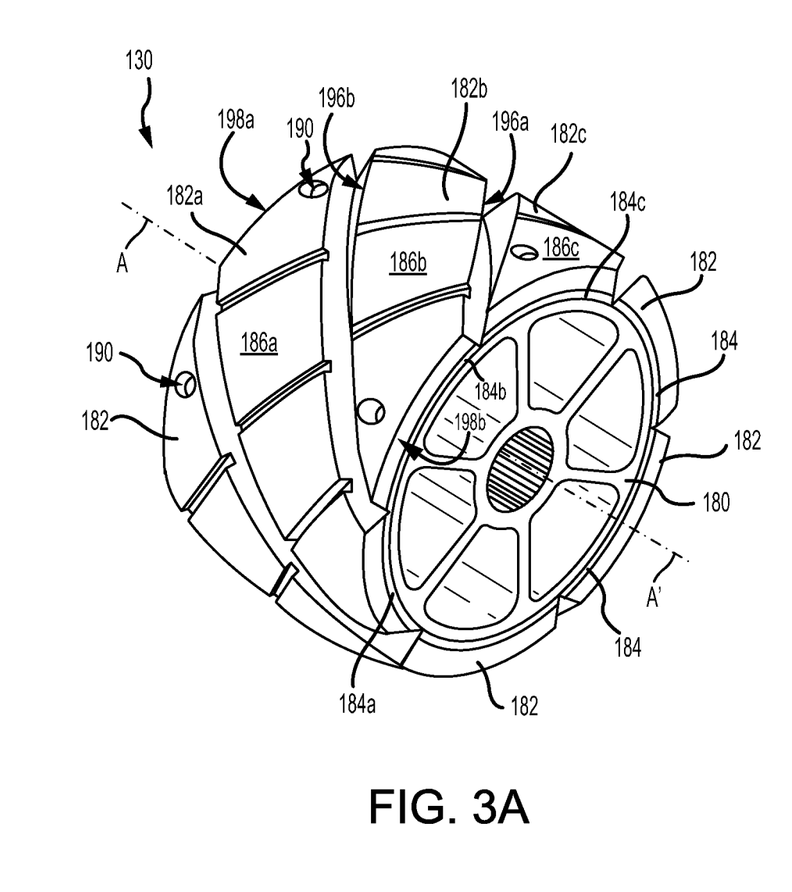
FIGS. 3A and 3B illustrate perspective views of a tire having discrete traction elements, in accordance with various embodiments.
Figure 3B:
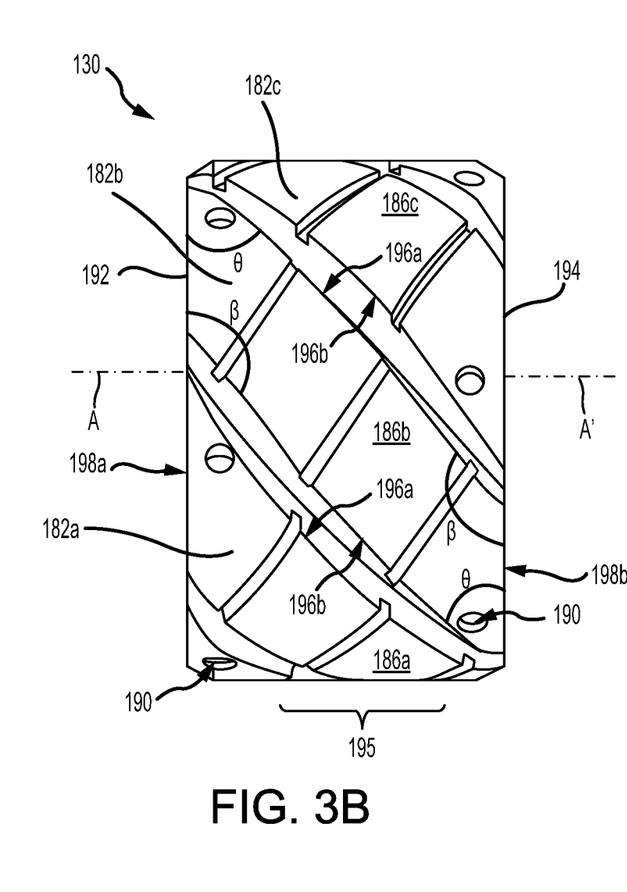

Referring now to FIGS. 3A and 3B, tire 130 is illustrated in accordance with various embodiments. Tire 130 includes hub 180 and a plurality of traction elements 182 coupled to hub 180. Traction elements 182 are discrete from one another, such that a single traction element 182 can be removed from hub 180, without removing any of the other traction elements 182. In various embodiments, circumferentially adjacent traction elements 182 may axially overlap. For example, first traction element 182a axially overlaps (i.e., is axially adjacent to) circumferentially adjacent second traction element 182b, and second traction element 182b axially overlaps circumferentially adjacent third traction element 182c. In various embodiments, traction elements 182 are axially overlapped such that at least two traction elements 182 of tire 130 will contact a ULD or other load being translated by tire 130. For example, in various embodiments, first traction element 182a extends circumferentially to, at least, where third traction element 182c beings to axially overlap second traction element 182b.

In various embodiments, each traction element 182 extends from a first axial end 192 of tire 130 to a second axial end 194 of tire 130. Second axial end 194 is axially opposite first axial end 192. Each traction element 182 comprises a first axially extend edge 196a and a second axially extending edge 196b. Second axially extending edge 196b is generally circumferentially opposite first axially extending edge 196a. First and second axially extending edges 196a, 196b extend from first axial end 192 of tire 130 to second axial end 194. The first axially extending edge 196a of each traction element 182 is circumferentially adjacent to the second axially extending edge 196b of the adjacent traction element 182. Each traction element 182 further comprises a first circumferentially extending edge 198a and a second circumferentially extending edge 198b. Second circumferentially extending edge 198b is axially opposite first circumferentially extending edge 198a. First and second circumferentially extending edges 198a, 198b extend from first axially extending edge 196a to second axially extending edge 196b. In various embodiments, first axially extending edge 196a may be oriented at an acute angle theta (θ) with respect to first circumferentially extending edge 198a, and at an obtuse angle beta (β) with respect to second circumferentially extending edge 198b. Second axially extending edge 196b may be oriented an acute angle theta (θ) with respect to second circumferentially extending edge 198b, and an obtuse angle beta (β) with respect to first circumferentially extending edge 198a. First and second axially extending edges 196a, 196b may be configured to be non-parallel with axis of rotation A-A'.

Figure 4:
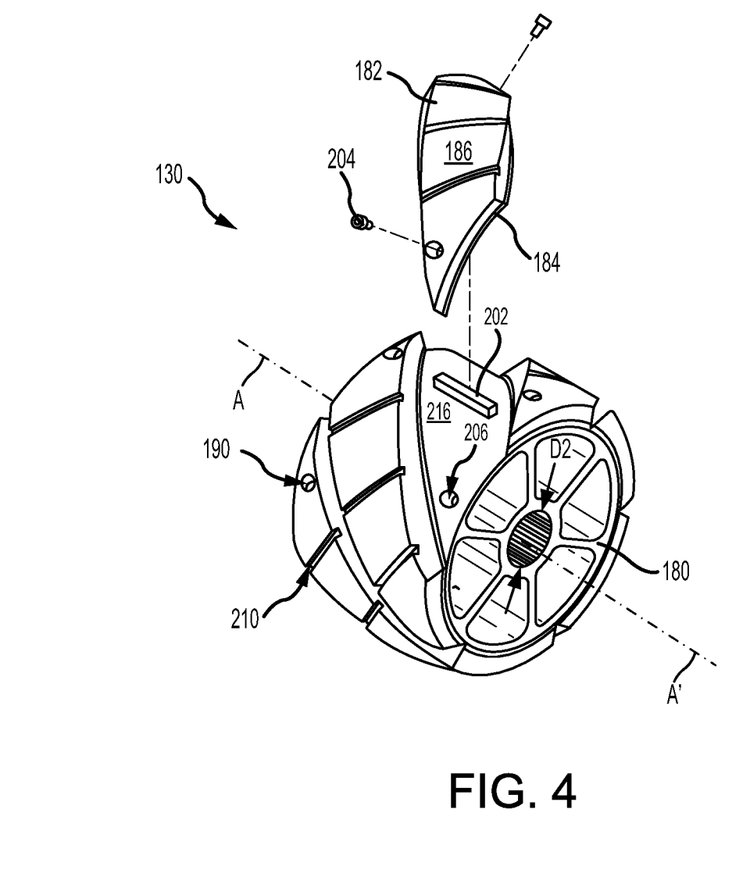
FIG. 4 illustrates an assembly view of a tire having discrete traction elements, in accordance with various embodiments.
Figure 5:
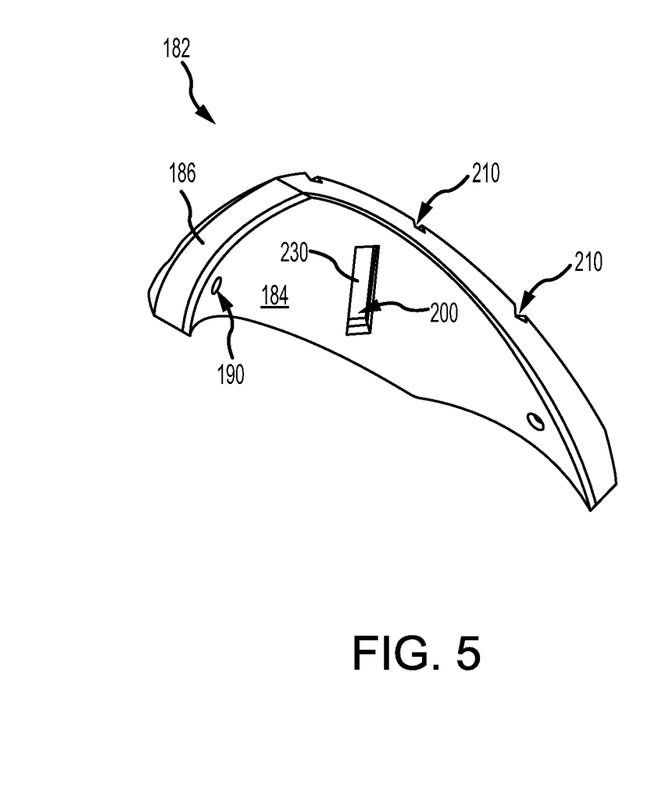
FIG. 5 illustrates a perspective view of a traction element for a tire, in accordance with various embodiments.

With reference to FIG. 4 and FIG. 5, each traction element 182 of tire 130 includes a backing plate 184 and an elastomeric material 186 bonded to backing plate 184. Backing plate 184 may comprise a rigid material. In various embodiments, backing plate 184 may be made from a metal or metal alloy, such as, for example, aluminum, titanium stainless steel, etc. Backing plate 184 may also be made from polyvinyl chloride, ceramic, wood, or any other suitably rigid structure.

In various embodiments, backing plate 184 may define an aperture 200. Aperture 200 is configured to receive a protrusion 202 extending from a radially outward surface 216 of hub 180. Locating protrusion 202 within aperture 200 may facilitate transmission of torque from hub 180 to traction element 182. While each traction element 182 is illustrated as including one aperture 200 having a generally rectangular shape, it is further contemplated and understood that each backing plate 184 may define any number of apertures 200, having any desired geometry with each aperture configured to receive a protrusion of a corresponding geometry extending from radially outward surface 216 of hub 180. In various embodiments, back plate 184 may include a protrusion and radially outward surface 216 of hub 180 may define an aperture configured to receive the protrusion.

Each traction element 182 may be coupled to hub 180 via one or more fasteners 204. Fasteners 204 may comprise a screw, rivet, clip, nut and bolt, or other suitable securement device. Hub 180 may include orifices 206 configured to receive fasteners 204. Fasteners 204 may be located through apertures 190 defined by traction elements 182.

In various embodiments, elastomeric material 186 may define one or more slots, or grooves, 210. Grooves 210 are configured to extend partially through elastomeric material 186 in the radial direction, such that at least a portion of elastomeric material 186 remains between a radially inward surface of groove 210 and backing plate 184.

Elastomeric material 186 may be configured to have a desired spring constant. Elastomeric material 186 may comprise nitrile rubber, carboxylated nitrile rubber, hydrogenated nitrile butadiene rubber, polyether polyurethane, or other elastomeric material. In various embodiments, a hardness of elastomeric material 186 may be greater proximate first and second circumferentially extending edges 198a, 198b, as compared to an area 195 between first and second circumferentially extending edges 198a, 198b. Locating harder elastomeric material 186 at first and second axial ends 192, 194 of tire 130 may better protect tire 130 from being damaged by loads moving axially across tire 130. In various embodiments, the material properties (e.g., hardness, elasticity, etc.) of elastomeric material 186 may vary between circumferentially adjacent traction elements 182. For example, with momentary reference to FIG. 3A, elastomeric material 186a of first traction element 182a may be different from elastomeric material 186b of second traction element 182b.

Returning to FIG. 2C, traction elements 182 of tire 130 can be replaced without having to remove hub 180 from PDU 110. This reduces time and effort associated with removing the entire tire 130 as well as the cost of replacing hub 180 and each time a traction portion of tire 130 needs replacing.

Though tire 130 has been disclosed herein as being compatible with use on aircraft systems, such as PDUs, other uses are contemplated, such as for providing motive force in factories, package delivery centers, luggage transportation, tractors, automobiles, and/or other systems and articles where it may be desirable to replace tire tractions elements without removing the entire tire.

Figure 6:
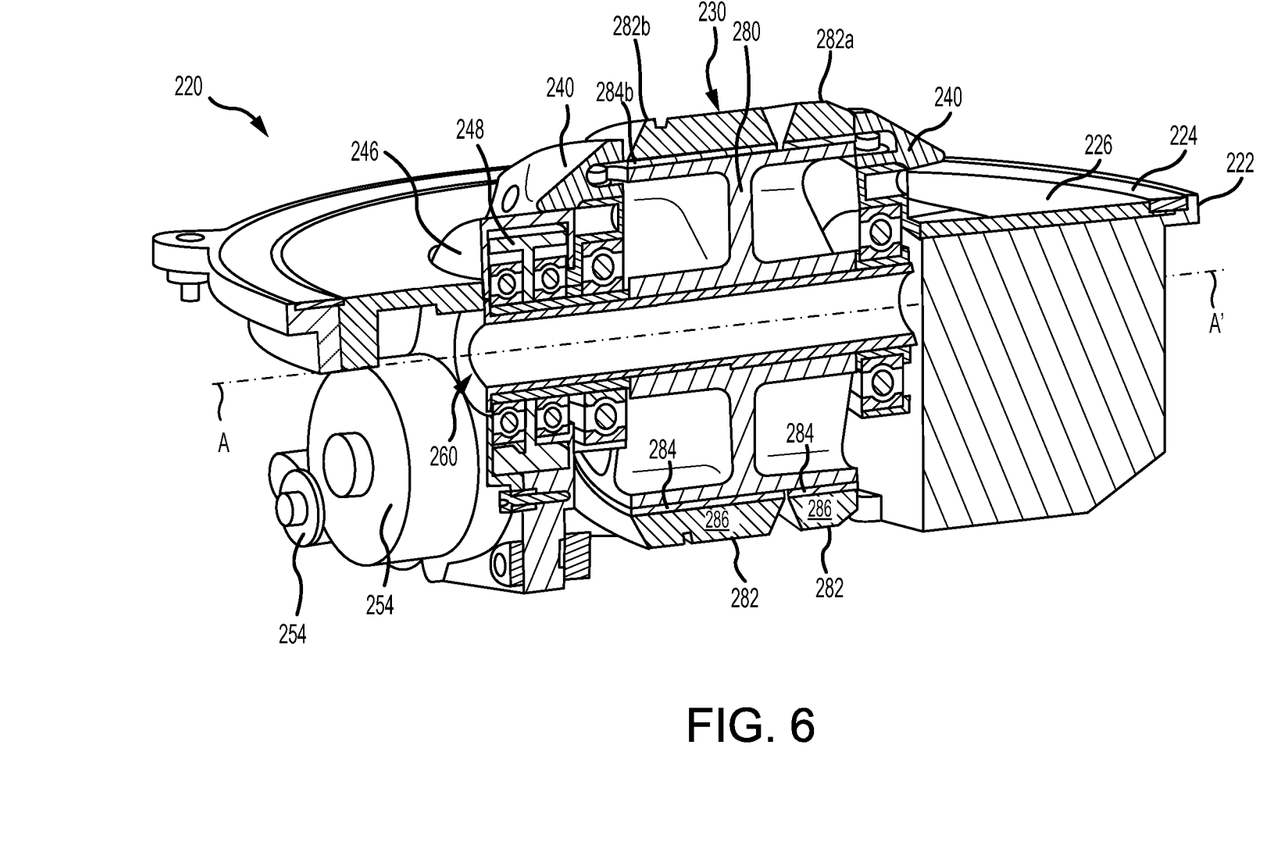
FIG. 6 illustrates a cross section view of a PDU having a tire with discrete traction elements, in accordance with various embodiments.

In various embodiments, and with reference to FIG. 6, a PDU 220, similar to PDU 110 in FIGS. 2A and 2B, is illustrated, in accordance with various embodiments. PDU 220 includes a mounting ring 222, a pivot plate 224, a removable cover 226, a tire 230, and skid plates 240 located at opposing axial ends of tire 230. Tire 230 is similar to tire 130 in FIG. 3A, and includes a plurality of discrete traction elements 282. Traction elements 282 each include a backing plate 284 and an elastomeric material 286 bonded to the backing plate 284. Traction elements 282 are configured to axially overlap (e.g., first traction element 282a is axially adjacent second traction element 282b).

PDU 220 may also include a drive motor and lift actuator, similar to PDU 110. The drive motor may be operationally coupled to one or more gear trains 254. Gear trains 254 may be located between the drive motor and a gear 248 housed within a gear housing 246. Gear trains 254 are configured to transfer rotational motion from the drive motor to gear 248. Gear 248 may be rotationally coupled to an axle 260. Axle 260 is rotationally coupled to a hub 280 of tire 230. Gear 248 may transfer torque to, and drive a rotation of, axle 260, which in turn drives a rotation of tire 230. Axle 260 may comprise of a single, unibody structure, extending between axial ends of tire 230, as traction elements 282 of tire 230 can be replaced without having to remove hub 280 from PDU 220.

Figure 7:
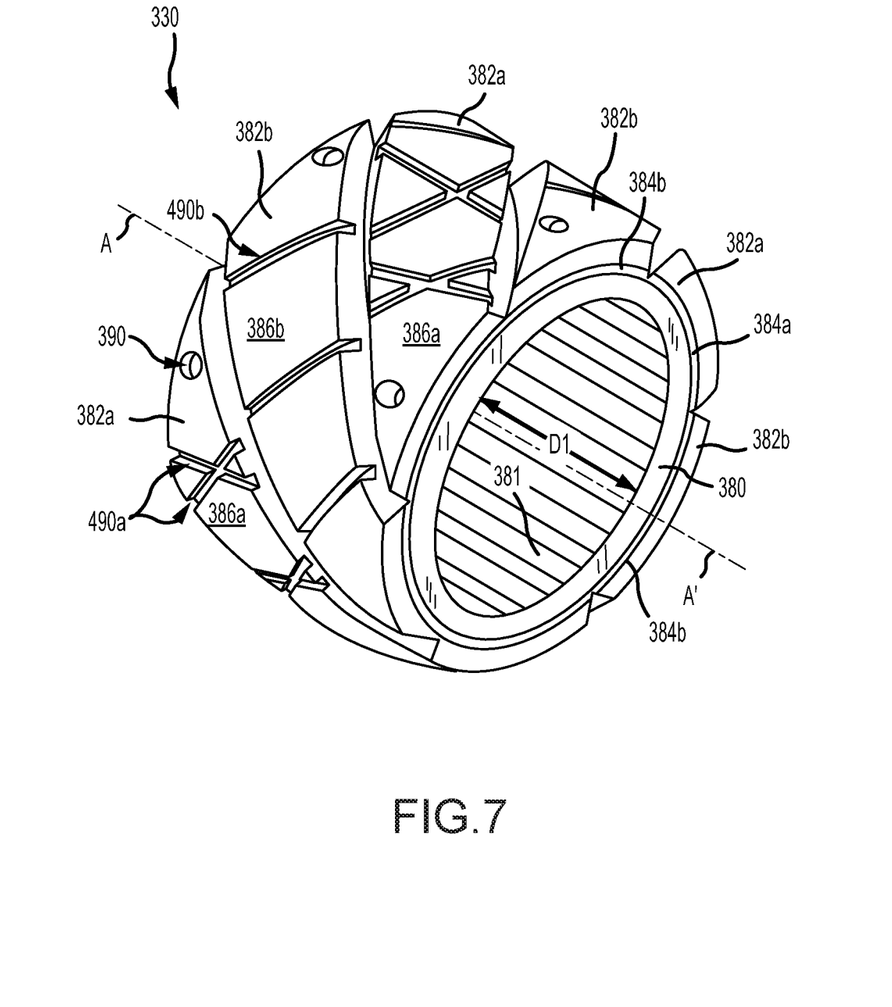
FIG. 7 illustrates perspective view of a tire having discrete traction elements, in accordance with various embodiments.

Referring to FIG. 7, a tire 330 having discrete traction elements 382 is illustrated, in accordance with various embodiments. In various embodiments, tire 330 may be designed to include a mixed configuration of tread patterns, durometers, studs, etc. For example, the elastomeric material 386 of traction elements 382 may be customized to build up a unique configuration of hardness and elasticity across tire 330. In various embodiments, tire 330 may include a set of first traction elements 382a designed for increased traction, or "grip,", between tire 330 and a pallet or other load being translated by tire 330 and a set of second traction elements 382b designed for increased life (i.e., decreased wear).

In various embodiments, elastomeric material 386a of first traction elements 382a may be more elastic and/or more easily compressed as compared to elastomeric material 386b of second traction elements 382b. The increased elasticity may generate increased friction between first traction elements 382a a load being moved by tire 330, while the increased hardness may increase the wear life of second traction elements 382b.

In various embodiments, a tread pattern of first traction elements 382a may from a tread pattern of second traction elements 382b. For example, elastomeric material 386a may define grooves 390a and elastomeric material 386b may define grooves 390b. The geometry, depth, and/or number of grooves 390a in first traction elements 382a may differ from the may geometry, depth, and/or number of grooves 390b in second traction elements 382b. For example, grooves 390a may be oriented in as an "X," while grooves 390b may be single linear strips. The geometry, depth, and/or number of grooves 390a may increase the friction between first traction elements 382a and a load being moved by tire 330, while the geometry, depth, and/or number of grooves 390a may increase the wear life of second traction elements 382b.

In various embodiments, a radial thickness of elastomeric material 386a may be different from a radial thickness of elastomeric material 386b. In various, a geometry of first traction elements 382a may differ from a geometry of second traction elements 382b. For example, a shape of the backing plates 384a of first traction elements 382a may be different from the shape of the backing plates 384b of second traction elements 382b. While tire 330 is illustrated as includes two sets of discrete traction elements, it is further contemplate and understood that tire 330 may include any number and combination of unique traction elements.

Traction elements 382 are coupled to a hub 380 of tire 330. As discussed in further detail below, a diameter D1 of hub 380 at radially inward surface 381 may be greater than a diameter D2 of tire 130, with momentary reference to FIG. 4, to accommodate components (e.g., gears) of PDU.

Figure 8:
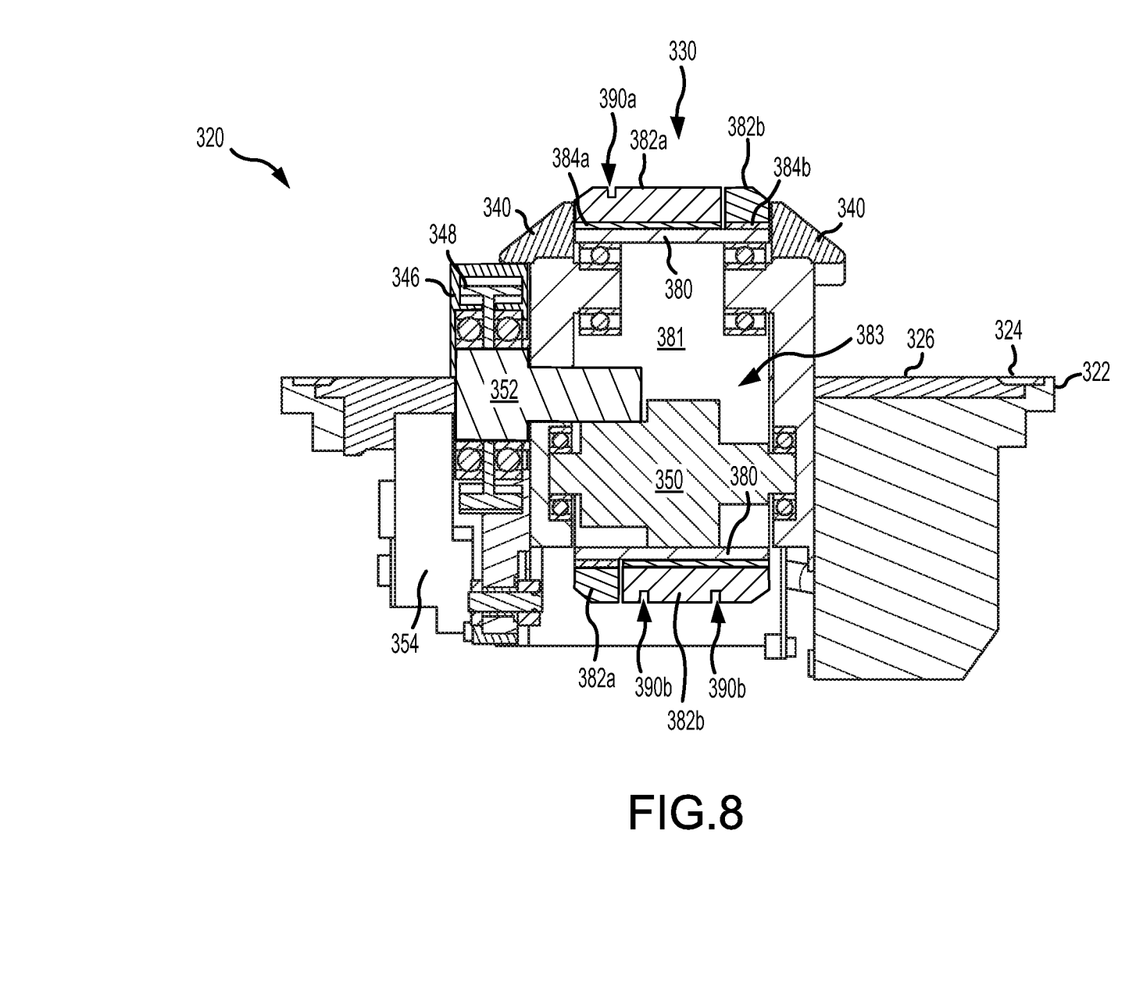
FIG. 8 illustrates a cross section view of a PDU having a tire with discrete traction elements, in accordance with various embodiments.

In various embodiments, and with reference to FIG. 8, a PDU 320 including tire 330 is illustrated, in accordance with various embodiments. PDU 320 may be similar to PDU 110 in FIGS. 2A and 2B. PDU 320 includes a mounting ring 322, a pivot plate 324, a removable cover 326, a tire 330, and skid plates 340 located at opposing axial ends of tire 330.

PDU 220 may also include a drive motor and a lift actuator, similar to PDU 110. The drive motor may be operationally coupled to one or more gear trains 354. Gear trains 354 may be located between the drive motor and a gear 348 housed within a gear housing 346. Gear trains 354 are configured to transfer rotational motion from the drive motor to gear 348. Gear 348 may be rotationally coupled to hub 380 via gear trains 352 and 350. For example, teeth on radially inward surface 381 of hub 380 may engage (i.e. mesh with) a gear of gear train 350. Gear 348 may transfer torque to, and drive a rotation of, gear train 352, which drives a rotation of gear train 350, which drives a rotation of tire 230. Portions of gear trains 350, 352 may be located within a volume 383 defined by radially inward surface 381 of hub 380, as traction elements 382 can be replaced without removing hub 380 from PDU 320. Locating components of PDU 320 within volume 383 may allow a size of PDU 320 to be decreased.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A tire, comprising:
    a hub;
    a first traction element coupled to the hub, the first traction element comprising a first backing plate and a first elastomeric material bonded to the first backing plate, wherein a first protrusion extending radially from the hub is located in a first aperture defined by the first backing plate; and
    a second traction element coupled to the hub, the second traction element comprising a second backing plate and a second elastomeric material bonded to the second backing plate, wherein a second protrusion extending radially from the hub is located in a second aperture defined by the second backing plate, and wherein the second traction element is discrete from the first traction element.

2. The tire of claim 1, wherein the first traction element axially overlaps the second traction element.

3. The tire of claim 2, wherein an axially extending edge of the first traction element is oriented at at least one of an acute angle or an obtuse angle with respect to a circumferentially extending edge of the first traction element.

4. The tire of claim 1, further comprising:
a first fastener coupling the first traction element to the hub, wherein the first fastener is located through the first traction element and is received by a first orifice of the hub; and
a second fastener coupling the second traction element to the hub, wherein the second fastener is located through the second traction element and is received by a second orifice of the hub.

5. The tire of claim 1, wherein a first groove pattern defined by the first elastomeric material is different from a second groove pattern define by the second elastomeric material.

6. The tire of claim 1, wherein the first elastomeric material is different from the second elastomeric material.

7. A power drive unit, comprising:
a tire including:
a hub, and
a plurality of traction elements coupled to the hub, wherein each traction element of the plurality of traction elements includes a backing plate and an elastomeric material bonded to the backing plate, and wherein a protrusion extending radially from the hub is located in an aperture defined by the backing plate of each traction element of the plurality of traction elements; and
a drive motor configured to drive a rotation of the tire.

8. The power drive unit of claim 7, wherein a first traction element of the plurality of traction elements axially overlaps a second traction element of the plurality of traction elements.

9. The power drive unit of claim 7, further comprising a gear located within a volume defined by a radially inward surface of the hub.

10. The power drive unit of claim 8, further comprising:
a first fastener coupling the first traction element to the hub; and
a second fastener coupling the second traction element to the hub.

11. The power drive unit of claim 7, wherein the elastomeric material of a first traction element of the plurality of traction elements is different from the elastomeric material of a second traction element of the plurality of traction elements.

12. The power drive unit of claim 7, further comprising an axle rotationally coupled to the hub, wherein the axle comprises a single unibody piece extending between opposing axial ends of the tire.

13. A tire for a power drive unit, comprising:
a first traction element comprising a first backing plate and a first elastomeric material bonded to the first backing plate, the first backing plate defining a first aperture; and
a second traction element adjacent to the first traction element and comprising a second backing plate and a second elastomeric material bonded to the second backing plate, the second backing plate defining a second aperture.

14. The tire of claim 13, wherein the first traction element axially overlaps the second traction element.

15. The tire of claim 13, further comprising a hub, wherein the first traction element and the second traction element are coupled to the hub.

16. The tire of claim 15, wherein the first aperture receives a first protrusion extending from the hub, and wherein the second aperture receives a second protrusion extending from the hub.

* * * * *